United States Patent [19]

Roberts et al.

[11] 3,820,562

[45] June 28, 1974

[54] CONTINUOUS LIQUID CHEMICAL INJECTOR

[75] Inventors: Thomas G. Roberts; Charles M. Rust; Billie O. Rogers; Henry L. Pratt, III, all of Huntsville, Ala.; Robert L. Morgan, Fayetteville, Tenn.

[73] Assignee: The United States of America as represented by the Secretary of the Army, Washington, D.C.

[22] Filed: Jan. 22, 1973

[21] Appl. No.: 325,499

[52] U.S. Cl. .............................................. 137/209

[51] Int. Cl. .............................................. H01s 3/00

[58] Field of Search ............... 137/209, 604, 505.42

[56] References Cited

UNITED STATES PATENTS

| | | | |
|---|---|---|---|
| 2,953,160 | 9/1960 | Brazier | 137/604 X |
| 2,963,040 | 12/1960 | Zimmer | 137/505.42 X |
| 3,084,634 | 4/1963 | McDougall | 137/604 X |
| 3,380,462 | 4/1968 | Schieber | 137/209 X |

*Primary Examiner*—Alan Cohan

*Attorney, Agent, or Firm*—Edward J. Kelly; Herbert Berl; Harold W. Hilton

[57] ABSTRACT

A continuous liquid chemical injector utilizing a back pressure of inert gas to control the amount of mass flow rate of a liquid chemical into the volume of interest such as the plenum of a gas dynamic laser or a combustion initiated chemical laser. The mass flow rates are continuous and can be varied with the variations being programmed when desired. The device permits no release or leakage of the chemicals to the atmosphere or the surroundings.

2 Claims, 2 Drawing Figures

CONTINUOUS LIQUID CHEMICAL INJECTOR

BACKGROUND OF THE INVENTION

At the present time chemical injectors operate by causing a positive displacement of some moving part like a hydraulic driven plunger or piston which is cycled so that the chemical is injected periodically and usually only relatively large volumes of liquid or relatively large mass flow rates can be handled. This type of device is not suitable for use as a water injector for an arc driven gas dynamic laser or as a $CS_2$ injector for a CO chemical laser where the mass flow rate must not only be controlled but must also be a continuous function of time, and where as in the case of $CS_2$ none of the chemical must be vented to the surroundings.

SUMMARY OF THE INVENTION

Apparatus of the present invention includes a liquid reservoir, a high pressure inert gas, a small diameter orifice needle, pressure transducers, valves, regulators, and electronic components arranged so that the mass flow rate of liquid chemicals is controlled, measured, and injected into volumes of interest such as the plenum of a gas dynamic laser, or the preburners of combustion driven chemical lasers. The mass flow rates may be set at predetermined constant values or they may be programmed functions of time.

DESCRIPTION OF THE PREFERRED EMBODIMENT

In operating arc-driven gas dynamic lasers or $CS_2 + O_2$ chemical lasers it becomes necessary to continuously inject controlled amounts of liquid chemicals into high pressure, high temperature environments. In the case of arc-driven GDL's small mass flow rates of $H_2O$ must be accurately controlled. This can be accomplished by utilizing a back pressure of inert gas to control the mass flow rate of a liquid chemical through an orifice. The properties of the flow of incompressible fluids through small diameter pipes and orifices are such that the mass flow rate is proportional to the pressure differential across the pipes. That is, $\dot{m} = K(\Delta P)^{1/2}$ where the constant of proportionality, $K$, is determined experimentally by calibration using water. The constant $K_{H_2O}$ for water can be transformed to $K_X$ for a liquid $X$ by $$K_X = K_{H_2O}\, \rho_X/\rho_{H_2O} \cdot \mu_{H_2O}/\mu_X$$

where $\rho$ is the density and $\mu$ is the viscosity. The effect of the temperature of the liquid is also included in these factors and can be corrected for when necessary. Thus, it is only necessary to calibrate with water and at only one value of the exit pressure, for example atmospheric. It is also possible to adjust the constant $K$ for different diameter orifices but it is best to calibrate each orifice used when accurate results are required. A hypodermic needle or variable orifice (needle valve) may be utilized and the range of mass flow rates for a given range of back pressures can be changed by simply changing the orifice diameter.

Figure 1:
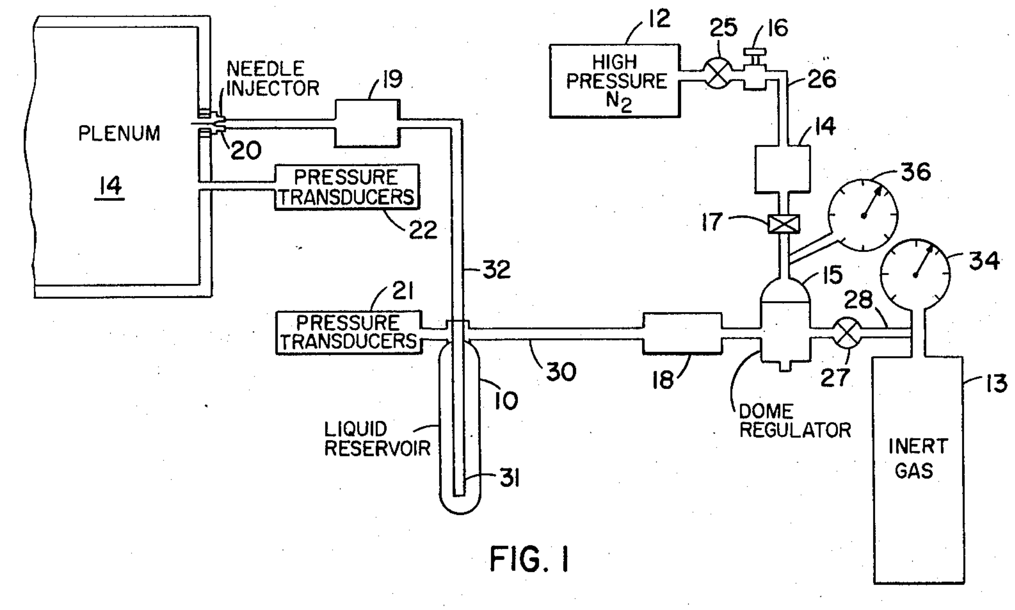
FIG. 1 is a diagrammatic view of the apparatus of the present invention.

As shown in FIG. 1 a liquid reservoir 10 is disposed in communication with a high pressure gas source 12, such as $N_2$, and a source of inert gas 13. A valve 14, a dome regulator 15, a hand regulator 16, a needle valve 17, and a cut off valve 25 is disposed in a line 26 which connects into the dome regulator 15 and the high pressure source 12. A second line 28 connects inert gas source 13 with dome regulator 15. A cut off valve 27 is disposed in line 28 between source 13 and regulator 15, third line 30 connects dome regulator 15 with the liquid reservoir 10. A valve 18 is disposed in line 30 intermediate dome regulator 15 and liquid reservoir 10. A line 32 is disposed in communication with reservoir 10 and a plenum 24. A valve 19 is disposed in line 32 intermediate the reservoir 10 and plenum 14. A needle injector 20 is disposed in line 32 at the junction thereof with plenum 24. A pair of pressure transducers 21 and 22 are respectively disposed in communication with liquid reservoir 10 and plenum 24. Visual pressure gauges 34 and 36 are respectively disposed in communication with inert gas source 13 and line 24.

Valves 14, 18 and 19 are similar to a valve manufactured by the Marotta Valve Corporation, Boonton, New Jersey. Such a valve is a fast acting solenoid operated valve with a balanced poppet to provide a high capacity. The balanced poppet moves between two soft, bubble tight seats and virtually eliminates pressure forces under all operating conditions. This feature permits sub-torr pressures on one side of the valve while maintaining very high (approximately 1,000 psia) pressures on the other side.

The dome regulator may be similar to that manufactured by Accessory Products Company, Division of Textron, Inc., Whittier, California. The pressure regulator controls the flow rate of the inert gas to the liquid reservoir. The dome regulator, is well known in the art, and, is a pressure regulator which is operated by gas pressure applied to the dome from the high pressure source 12. The back pressure on the liquid in the reservoir is controlled by the pressure on the dome regulator. The pressure on the surface of the liquid in the reservoir controls the mass flow rate of the liquid through pipe 31 and the injector 20.

The liquid chemical injector is arranged so that the mass flow rate can be programmed to vary as a function of time. The back pressure on liquid reservoir 10 is controlled by the pressure on the dome regulator 15. This pressure is in turn controlled by hand regulator 16, and the rate at which it appears on the dome is controlled by the needle valve 17. The "Marotta" valves are operated normally closed and only activated during the time of injection. By using multiple lines, "Marotta" valves, and needle valves to load the dome regulator the appearance of the back pressure on the liquid in the reservoir can be made to approximate many functions of time. The outputs of the two pressure transducers 21 and 22, are millivolt electrical signals which are proportional to the pressures sensed by the transducers and, are used to electronically calculate $(\Delta P)^{1/2}$ and this signal is then recorded as a measure of the mass flow rate. However, when the exit pressure is a preset constant, a recording of the back pressure on the liquid in the reservoir is sufficient to give the mass flow rate.

Before the injection system is operated the chemical reservoir 10 (FIG. 1), the high pressure $N_2$ or air supply 12, and the high pressure inert gas supply 13 are filled.

The valve 14, to dome regulator 15 is then opened and the hand regulator 16 is then used to set the desired pressure on the dome. If it is desired to have the pressure on the dome sampled so that the mass flow rate will be a linear function of the time then the needle valve 17 is set so that the preset dome pressure will build up slowly in time. The valve 14 can be operated so that the preset pressure on the dome is bled off after being set or this value of the pressure can be locked in so that it remains on the dome until changed by adjusting the hand regulator 16. The chemical injector 20 is now set and ready for operation. To operate the injector, valves 18 and 19 are opened. This admits the inert gas to the surface of the liquid in the reservoir 10; the liquid is forced through a connecting tube 31 to the injection needle 20, thus causing the liquid to be injected into the plenum 14 at a rate proportional to the square root of the difference in the pressure on the surface as measured by transducer 21 and the plenum pressure as measured by transducer 22. When it is desired to have the mass flow rate of the liquid to go to zero, the valves 18 and 19 are closed in that order. The period during which the liquid is injected can be predetermined by setting the timer (not shown) on the front of the control console (not shown) or the duration of the run can be operated manually.

Figure 2:
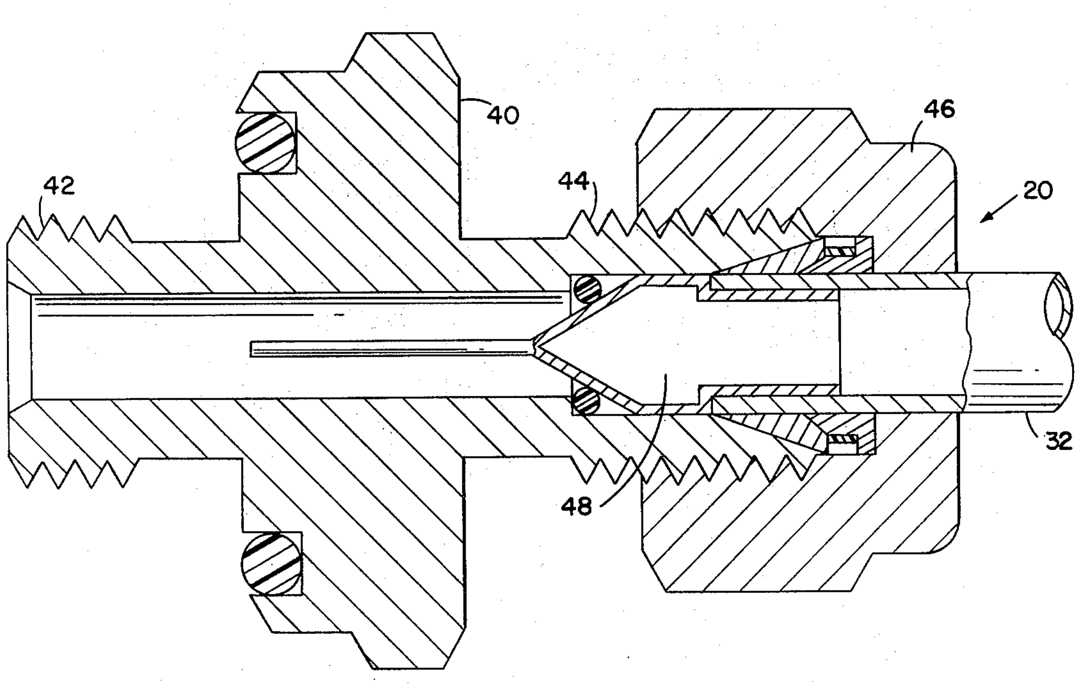
FIG. 2 is an elevational sectional view of the needle injection of FIG. 1.

FIG. 2 is an elevational sectional view of the injector 20, and is shown to include an end member 40 having threaded portion 42 for secured relation with plenum 14. A second threaded portion 44 is disposed for threaded engagement with a female member 46. A small diameter orifice injector 48 is carried in members 40 and 46 and in communication with conduit 32 which extends out of member 46.

We claim:

1. A continuous liquid injector for controlling the amount of mass flow rate of a liquid into a chamber comprising:

a. liquid reservoir means containing a liquid for injection into said chamber, said reservoir means disposed in communication with said chamber;

b. a source of inert gas disposed in communication with said liquid reservoir means at the upper portion thereof for directing said inert gas on the upper surface of said liquid;

c. conduit means having a first end disposed in communication with said liquid reservoir means and extending into said liquid, said conduit means having a second end disposed in communication with said chamber;

d. pressure means for regulating the pressure of said inert gas flowing to said liquid reservoir, said pressure means for regulating the pressure of said inert gas including a source of high pressure nitrogen, a dome pressure regulator disposed in communication with said nitrogen, valve means for controlling flow of said nitrogen to said dome pressure regulator;

e. injection means for injecting said liquid into said chamber, said injection means being disposed at said second end of said conduit and in communication with said chamber, said injection means including a first member disposed for secured relation with the wall of said chamber, a small orifice injector member partially carried in said first member, a second member disposed for secured relation with said first member, said second member partially enclosing said small orifice injector member and said conduit means for communiation therebetween; and f. a pair of pressure transducers, the first said pressure transducer disposed in communication with said liquid reservoir, the second said pressure transducer disposed in communication with said chamber.

2. Apparatus as set forth in claim 1 wherein said chamber is the plenum of a gas laser.

* * * * *